United States Patent [19]

Nad

[11] Patent Number: 5,797,756
[45] Date of Patent: Aug. 25, 1998

[54] GROUNDING BRACKET PARTICULARLY FOR USE IN A CONNECTING DEVICE FOR TELECOMMUNICATION AND DATA TRANSMISSION APPLICATIONS

[75] Inventor: Ferenc Nad, Berlin, Germany

[73] Assignee: Krone Aktiengesellschaft, Berlin-Zehlendorf, Germany

[21] Appl. No.: 719,314

[22] Filed: Sep. 24, 1996

[30] Foreign Application Priority Data

Sep. 29, 1995 [DE] Germany .............. 295 15 982.0

[51] Int. Cl.⁶ .................................................. H01R 9/26
[52] U.S. Cl. .................................. 439/94; 439/716
[58] Field of Search ...................... 439/94, 532, 716

[56] References Cited

U.S. PATENT DOCUMENTS 3,135,572  6/1964  Curtis et al. ............... 439/716
5,022,873  6/1991  Kollmann ................... 439/94
5,192,277  3/1993  Bales ........................ 439/716

FOREIGN PATENT DOCUMENTS 37 38 322  11/1987  Germany.

*Primary Examiner*—Gary F. Paumen
*Attorney, Agent, or Firm*—McGlew and Tuttle

[57] ABSTRACT

A grounding bracket, in particular for use in a connecting device for telecommunication and data transmission applications, in particular mounted on a hat-type rail as a carrier rail. An easy-to-replace grounding bracket for connecting devices is provided with different grounding tasks being possible in a simple way. Spring elements for resiliently latching in hat-type rail, a contact lug bent out from a bracket bottom and fastening elements for safe attachment at a bottom of a connecting device of telecommunication and data transmission applications are provided.

20 Claims, 6 Drawing Sheets

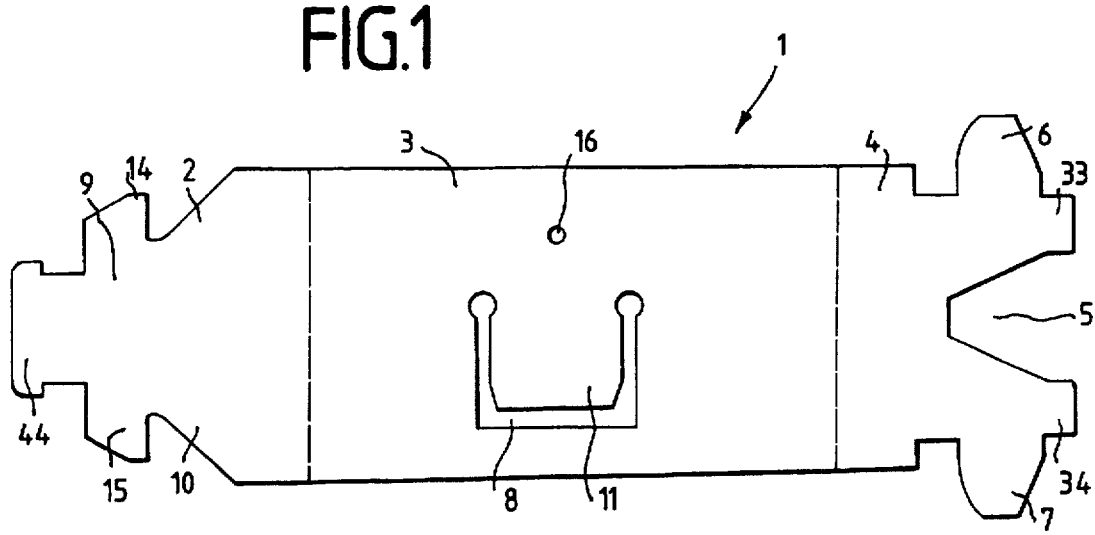
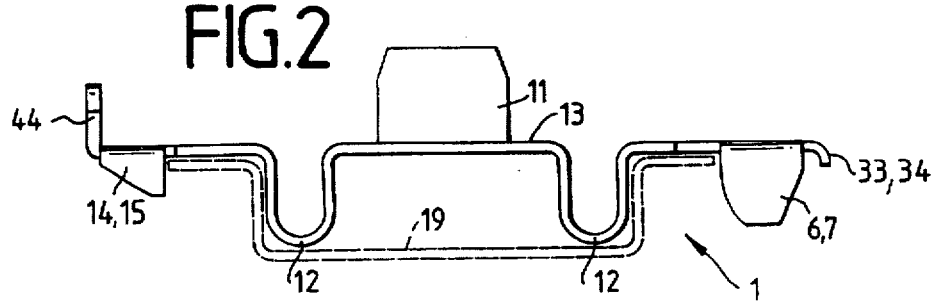
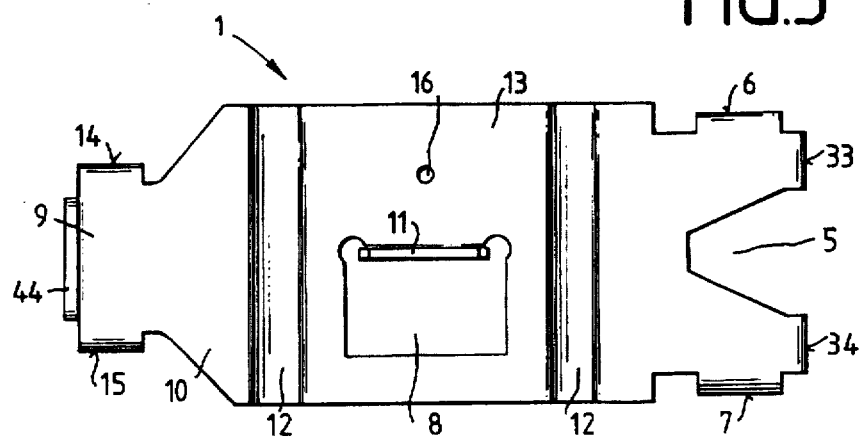

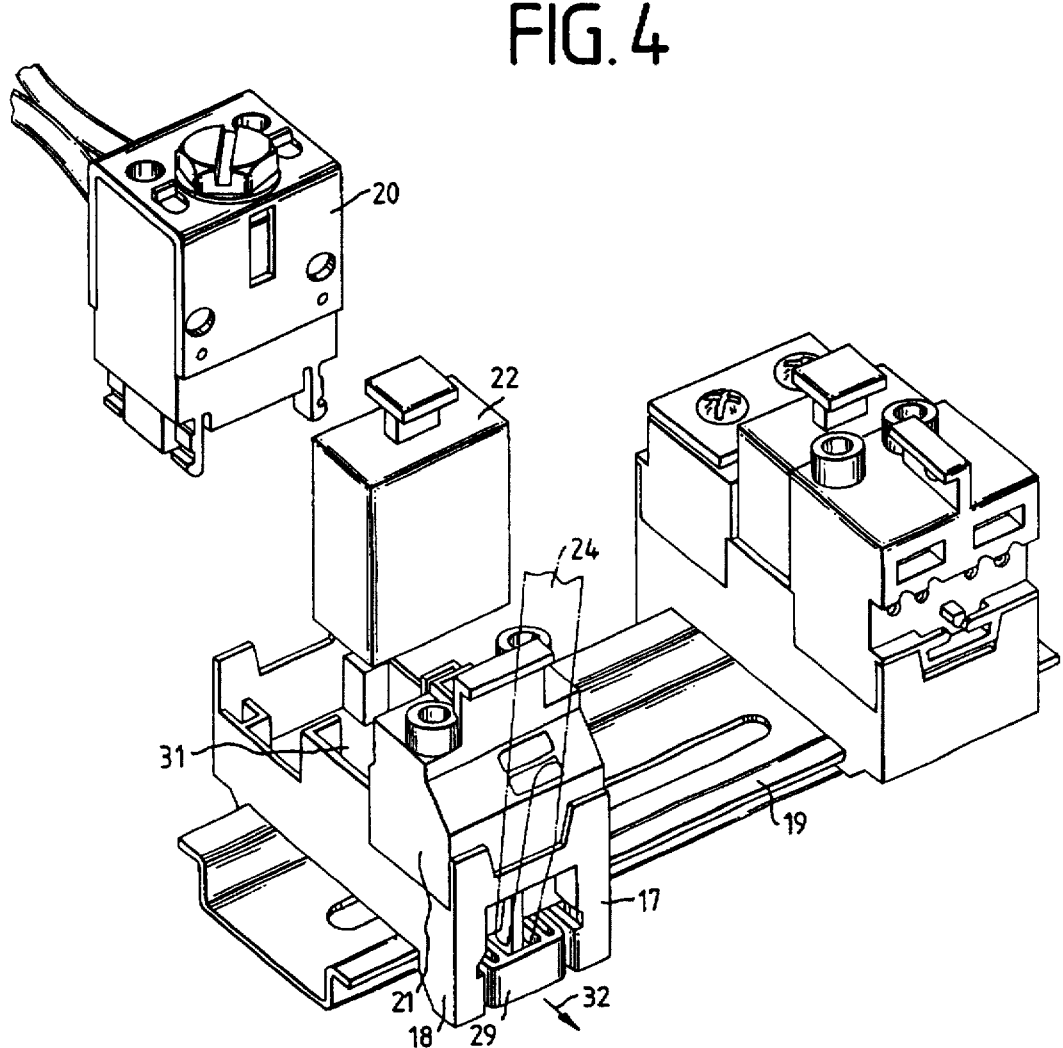

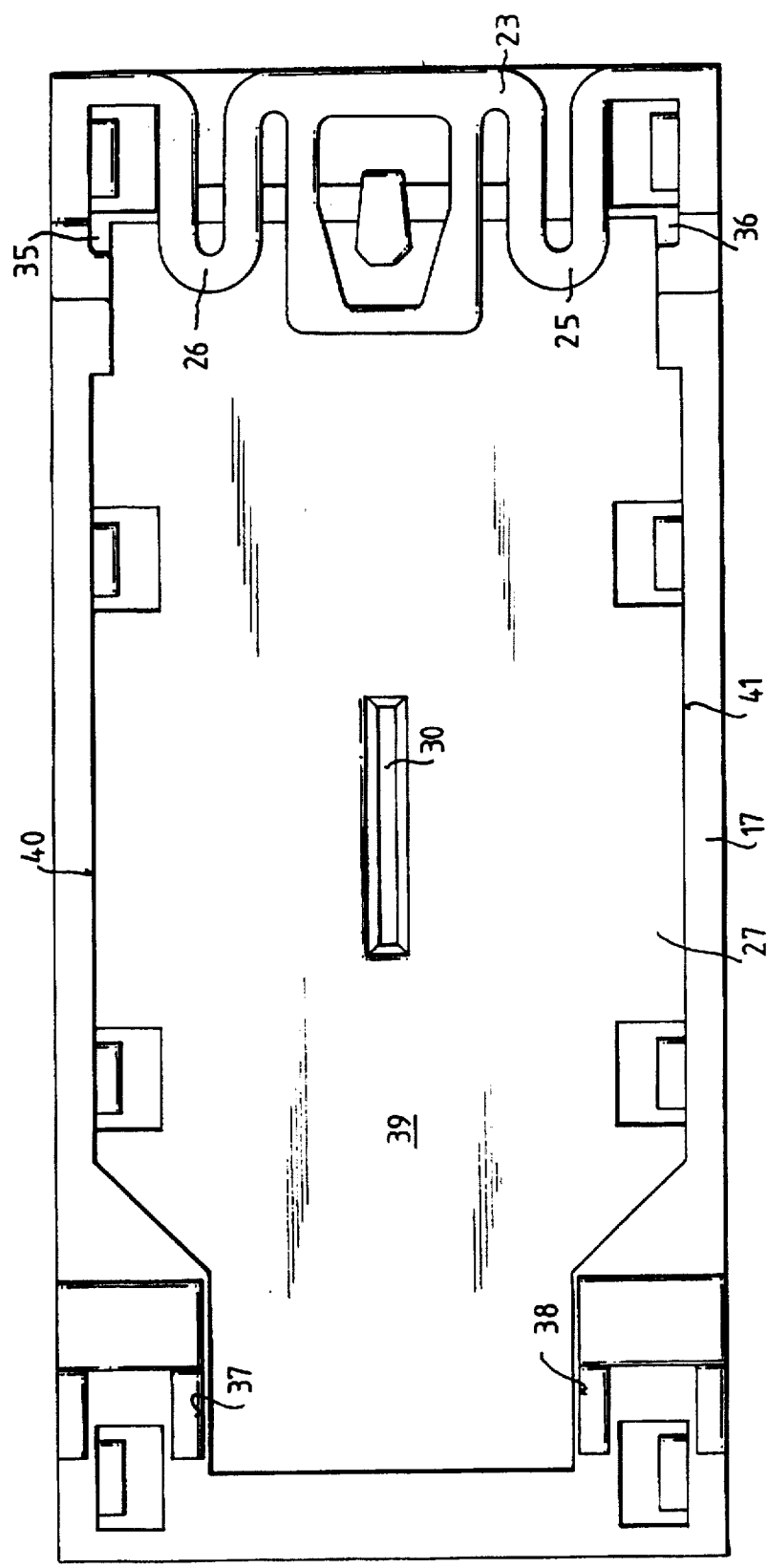

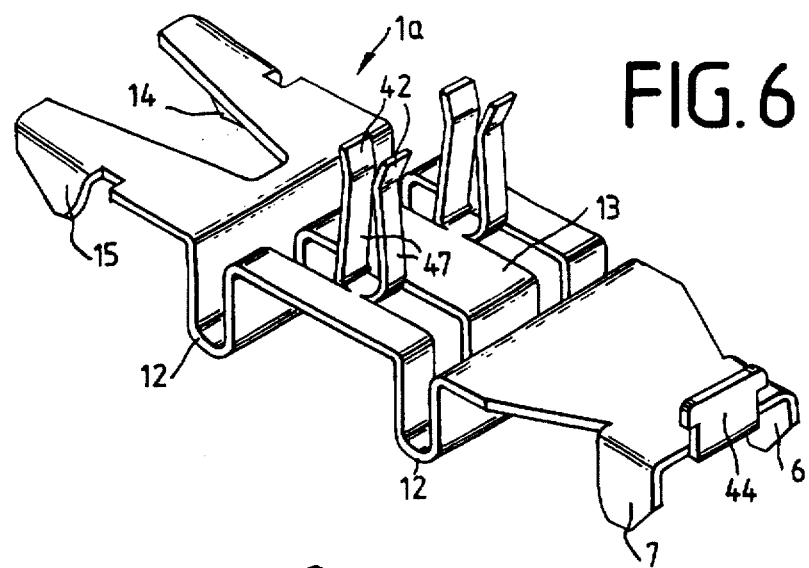
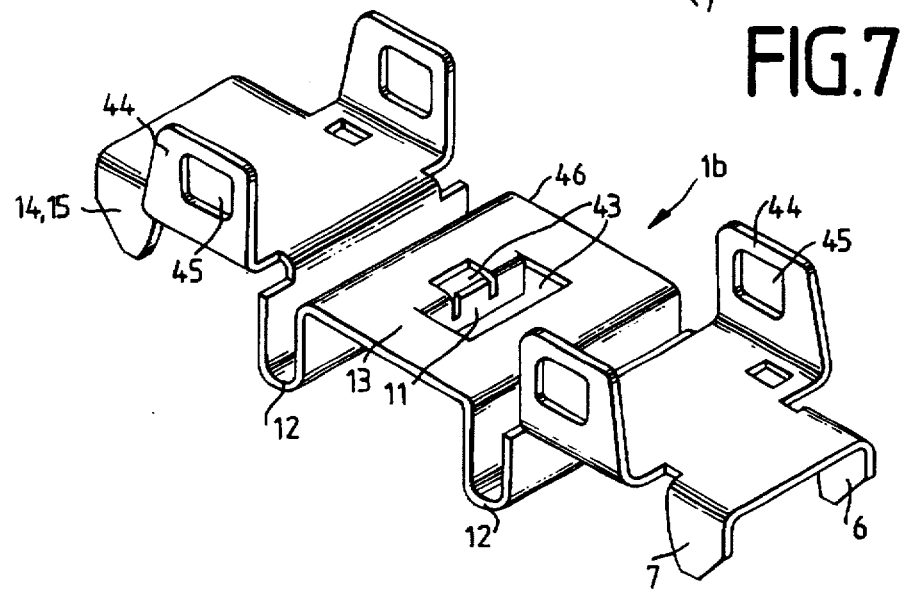
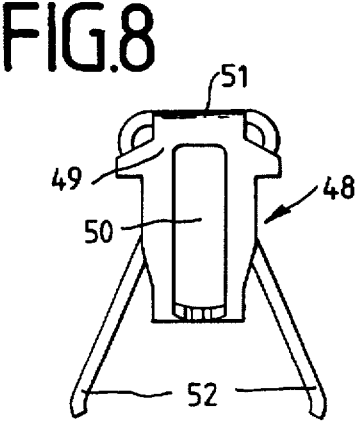 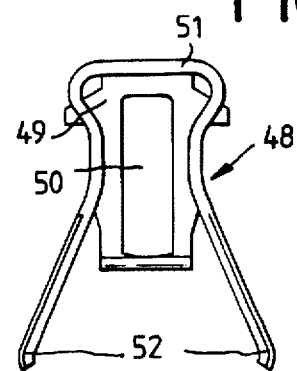

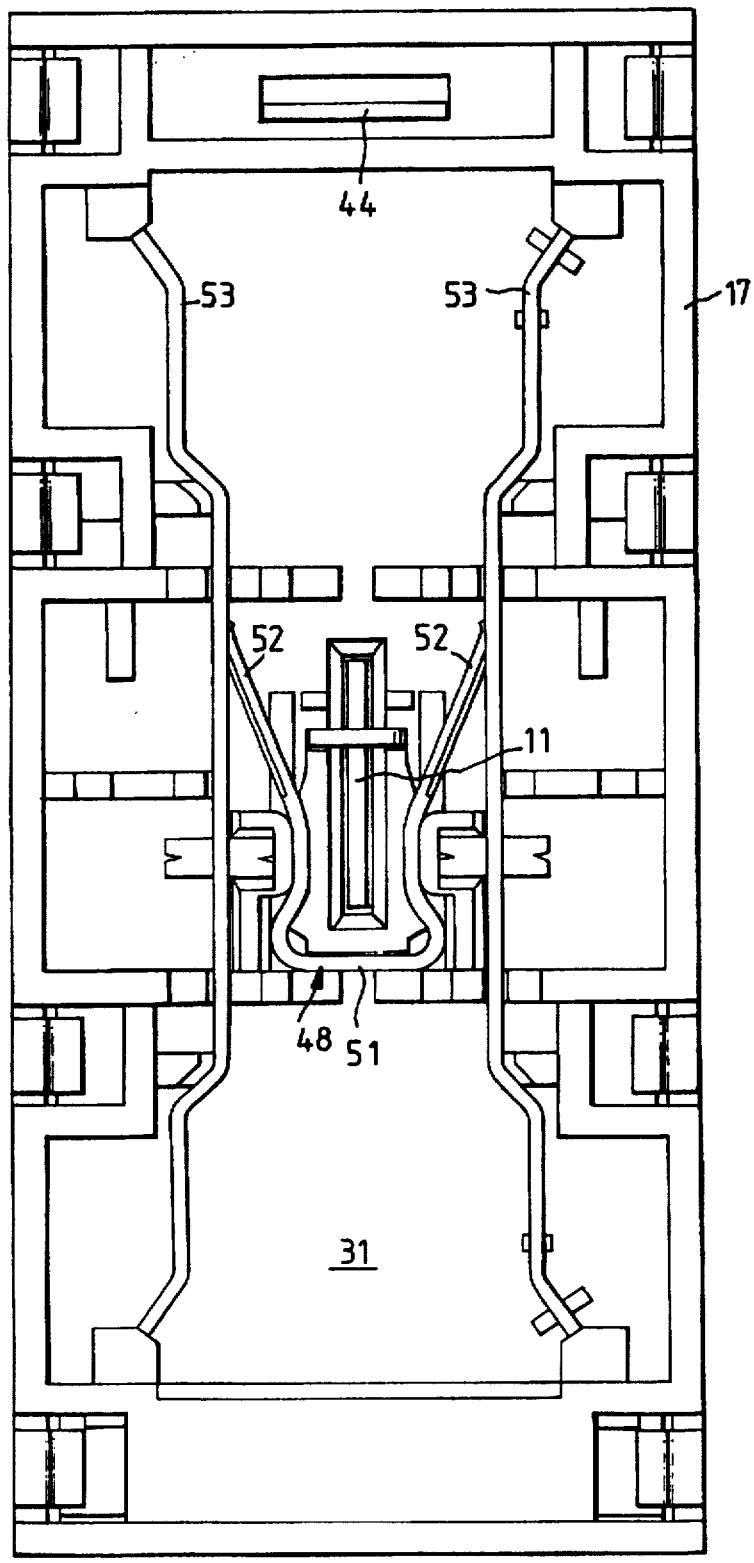

5,797,756

1

GROUNDING BRACKET PARTICULARLY FOR USE IN A CONNECTING DEVICE FOR TELECOMMUNICATION AND DATA TRANSMISSION APPLICATIONS

FIELD OF THE INVENTION

The present invention relates to an grounding bracket in particular for use in a connecting device for telecommunication and data applications.

BACKGROUND OF THE INVENTION

From DE 37 38 322 C2 there is known in the art a terminal block which is composed of a base element that is disposed over resilient latch elements on a carrier rail. In the base element there is provided a receiving opening for a connector element. In the carrier rail there is positioned a U-shaped grounding (grounding) rail. The resilient grounding contact provided in a plug portion of a connection part will contact the grounding rail, so that a grounding line of the connection part is electrically connected to the carrier rail. Since the carrier rail is mounted on a frame, the ground potential will be carried away over the frame. This kind of grounding requires a grounding rail in the carrier rail even at those sections, where it is not required. The grounding rail is hard to replace due to its special shape, and cannot be removed without a tool.

It is the aim of this described design to provide extension and reduction possibilities for terminal blocks, without impairing the electrical connections between the partial blocks. The terminal blocks do not allow, however, the combination of different connection possibilities from functional components, for example to have thick and thin cable wires in one terminal or to apply different protection circuits each having its separate grounding device.

SUMMARY AND OBJECTS OF THE INVENTION

It is therefore the object of the invention to develop an easy-to-replace grounding bracket for connecting devices that are in particular positioned on a hat-type rail, by means of said grounding bracket different grounding tasks being possible in a simple way.

According to the invention, a grounding bracket is provided, particularly for use in a connecting device for telecommunication and data transmission applications, in particular mounted on a hat-type rail as a carrier rail. Spring elements for resiliently latching in a hat-type rail (a rail with a central channel having a hat shape in cross section), a contact lug bent out from the bracket bottom and fastening elements for safe attachment at bottom of the connecting are provided.

The grounding bracket permits reliable and easy-to-remove grounding of individual functional components of a connecting device for telecommunication and data transmission applications by the used carrier rail or as an option by the grounding line to be connected.

The spring elements are preferably formed by two U-shaped configurations, and the contact lug is preferably formed by cutting-free a portion from the bracket bottom. The spring elements are preferably disposed tightly against hat-type rail, and contact lug is disposed between the two spring elements.

The geometry is adapted to the geometry of bottom surface of connecting device, and is latched thereinto. A connection possibility for a grounding line is preferably provided at the contact lug. The contact lug is preferably configured as a fork contact. Cut-free portions may be provided in the bracket bottom on either side of the contact lug. At longitudinal sides of the bracket latch lugs with openings may be provided. An additional spring may be mounted over the contact lug of grounding bracket. The additional spring has spring arms electrically connecting contact rails provided in the base element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a top view of the grounding bracket, in a flat state, according to a first embodiment of the invention;

FIG. 2 is a side view of the grounding bracket of FIG. 1;

FIG. 3 is a top view of the grounding bracket of FIGS. 1, 2;

FIG. 4 is a perspective representation of a connecting device;

FIG. 5 is a bottom view of the base element of the connecting device of FIG. 4;

FIG. 6 is a perspective view of a grounding bracket according to a second embodiment of the invention;

FIG. 7 is a perspective view of a grounding bracket according to a third embodiment of the invention;

FIG. 8 is a bottom view of an additional spring;

FIG. 9 is a top view of the additional spring of FIG. 8;

FIG. 11 is a top view of the base portion and the additional spring.

DESCRIPTION OF THE PREFERRED EMBODIMENTS

Figure 10:
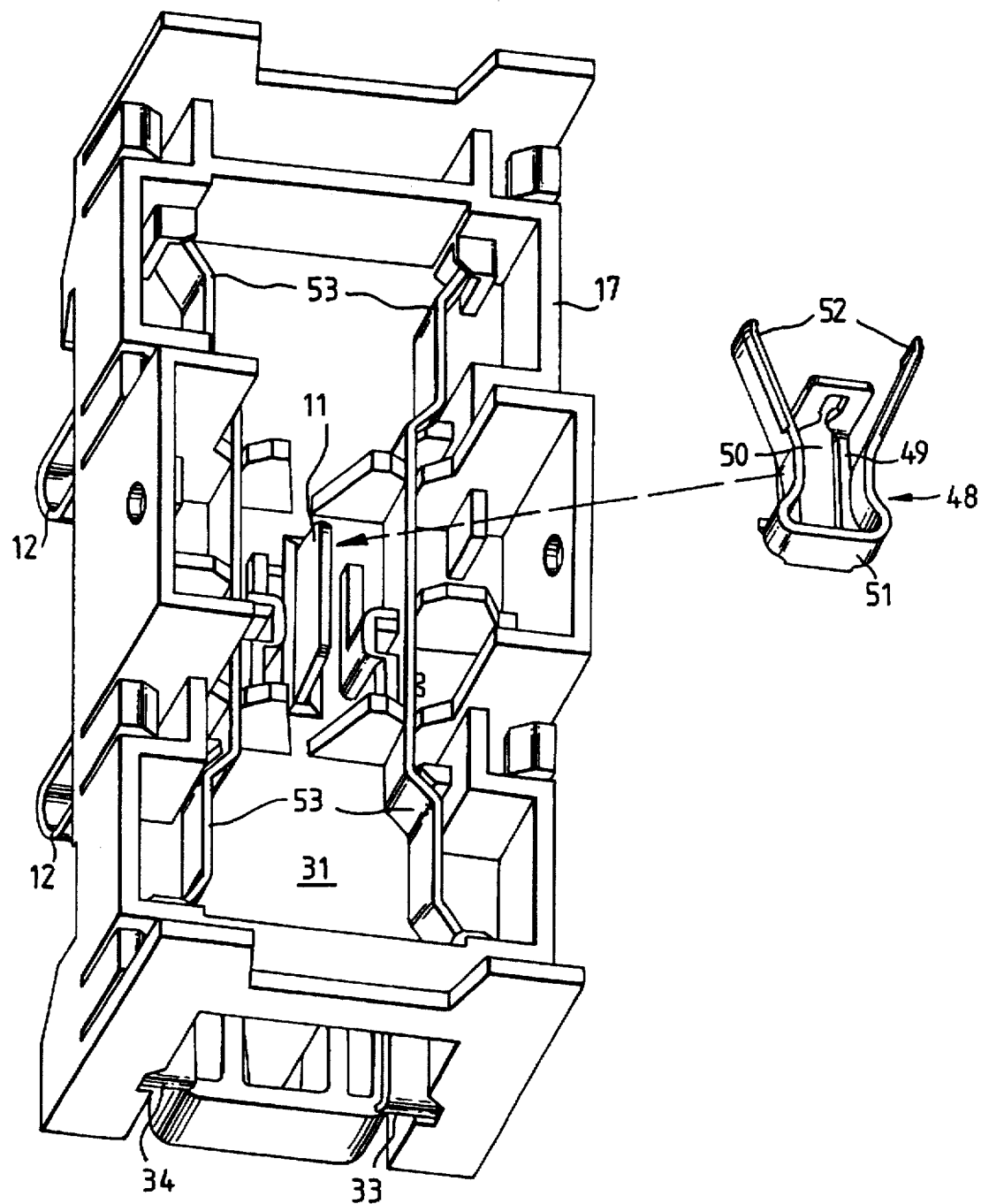
FIG. 10 is a perspective view of the base element and of the additional spring.

Referring to the drawings in particular, FIG. 1 shows a grounding bracket 1 for use in connecting devices of the telecommunication and data transmission applications. The grounding bracket 1 is mounted on a hat-type rail (a rail with a central channel having a hat shape in cross section) 19 (FIG. 4). By means of grounding bracket 1, an electrically conductive connection between the connecting device and hat-type rail 19 is established.

Grounding bracket 1 is formed, according to the representation in FIG. 1, of a sheet-metal strip substantially comprising a section 4 with a V-shaped cutout 5 and latch surfaces 6, 7, a section 3 with a cutfree portion 8 from which a contact lug 11 is bent out, and a section 2 with two truncated-cone portions 9, 10.

From FIGS. 2, 3 the configuration of the grounding bracket 1 can be seen, as a component of the arrangement. Latch surfaces 6, 7 are rectangularly and downwardly bent off from bracket bottom 13. Contact lug 11 is rectangularly and upwardly bent out from cut-free portion 8. U-shaped spring elements 12 are provided at the right and left-hand side of cut-free portion 8 at the bracket bottom. The distance of spring elements to each other corresponding to the interior width of standardized hat-type rail 19 used for mounting the connecting device. Latch surfaces 14, 15 of portion 9 are also rectangularly and downwardly bent out from portion 9. A borehole 16, in bracket bottom 13, can be provided for example in order to connect a separate grounding line (not shown).

Grounding bracket 1 is adapted with its fastening elements including latch surfaces 6, 7, 14, 15, cutout 5, portion 9, to the geometry of bottom 27 of base element 17 of the connecting device and is latched in bottom 27 of base element 17. For this purpose, a latch lug 44 is provided at the front of grounding bracket 1. Then contact lug 11 of grounding bracket 1 passes through an opening 30 in bottom 27 of base element 17 and projects into a chamber 31 of base element 17 arranged thereabove, into which for example a voltage surge protection plug can be inserted as a functional component 22 (FIGS. 4, 5).

Connecting devices represent an interface between a subscriber and an exchange office in a telephone or data network.

The connecting device shown as an example comprises according to the representation in FIG. 4 base element 17 which is latched by latch elements 18 on carrier rail 19, here in the form of a standardized hat-type rail.

On base element 17 there can be mounted connection elements 20, 21 and functional components 22 in receiving portions of base element 17. Functional components 22 are each positioned between connection elements 20, 21 in chamber 31 of base element 17.

Functional component 22 can, depending on the application, for example be a voltage surge protection element.

Base element 17 comprises according to the representation in FIG. 5 an integral spring element 23 latching over hat-type rail 19 and being released by a screwdriver 24 (FIG. 4) or other suitable tool, in order to remove base element 17 latched on hat-type rail 19. If required, grounding bracket 1 can then be inserted into base element 17 or released therefrom.

Spring element 23 (FIG. 5) serves for holding base element 17 on hat-type rail 19. Spring element 23 is according to the representation in FIG. 5 formed of two resilient wave elements 25, 26 at bottom 27 of base element 17 (FIG. 5). By inserting screwdriver 24 into an opening 22 in base element 17 and lifting it, a holding element 29 in base element 17 is moved in the direction of arrow 32 and unlatches base element 17 from hat-type rail 19 (see FIG. 4). Grounding bracket 1 is slid with surfaces 33, 34 (FIGS. 1, 3) and cutout 5 under spring element 23 of base element 17, so that latch surfaces 6, 7 (FIGS. 1 to 3) each project into chambers 35, 36 and are supported therein. Latch surfaces 15, 16 of grounding bracket 1 are supported on surfaces 37, 38 (FIG. 5) of bottom 27 of base element 17. In total grounding bracket 1 fills up approximately the area of bottom 27 limited by edges 40, 41, said edges also representing guide surfaces for grounding bracket 1.

Into base element 17 there can be inserted two not shown contact tracks in slots, by means of which the electrical connection between inserted connection elements 20, 21 and respectively inserted functional component 22 is established. The contact tracks extend in the central section of base element 17. Contact lug 11 of grounding bracket 1 projects between the contact tracks into the interior of base element 17.

Functional component 22 shown in FIG. 4 is configured as a voltage surge protection device to be inserted into base element 17, with a not shown surge arrester for the protection of lines. Functional component 22 contacts, as described above, with its contacts contact lug 11 of grounding bracket 1 mounted in base element 17. By borehole 16 of grounding bracket 1, for example a threaded borehole, a not shown grounding line can be connected.

Grounding bracket 1a shown in FIG. 6 is provided with two fork contacts 42. The two contact lugs 47 are rectangularly bent out from bracket bottom 13. In the same manner as in the first embodiment, fork contacts 42 pass through a not shown opening in bottom 27 of base element 17 and project into a chamber 31 of base element 17 arranged thereabove. Into fork contacts 42 there can thus be inserted contact lugs which are connected for example with a voltage surge protection plug or with insulation displacement contacts.

Grounding bracket 1b in the third embodiment shown in FIG. 7 is provided, in the same manner as the first embodiment of grounding bracket 1, with a contact lug 11. Contact lug 11 is bent at a right angle downwardly from bracket bottom 13. On either side of contact lugs 11 there are provided cutfree portions 43. Over contact lugs 11 there can be latched a not shown fork contact passing through an opening 30 in the bottom of base element 17 and being connected to a voltage surge protection plug or to a grounding rail existing in base element 17. Here, too, latch lugs 44 with openings 45 are provided that pass through openings (not shown) in bottom 27 of base element 17 and establish a mechanical connection between base element 17 and grounding bracket 1b by not shown latch cams in bottom 27. Grounding bracket 1b is thus rigidly fixed at base element 17.

In FIGS. 8 and 9 is shown an additional spring 48. Additional spring 48 is composed of a rectangularly shaped base portion 49 with a slotted receiving portion 50. At the front side of base element 49 is formed a U-shaped spring element 51 with two spring arms 52. Spring arms 52 are thus located on either side of slotted receiving portion 50.

As is shown in FIGS. 10 and 11, an additional spring 48 (in chamber 31 of base element 17) is mounted on contact lug 11 of grounding bracket 1. Contact lug 11 is inserted into slotted receiving portion 50 and establishes thus an electrical connection between grounding bracket 1 and additional spring 48.

Spring arms 52 of additional spring 48 rest against two contact rails 53 being disposed parallelly to each other in chamber 31 of base element 17. Additional spring 48 connects thus the two contact rails 53 to each other and establishes a short-circuit between contact rails 53. By insertion of functional component 22 shown in FIG. 4, spring arms 52 of additional spring 48 are lifted off by not shown separation elements from contact rails 53; the electrical connection or the short-circuit, respectively, is interrupted. Contact rails 53 each being connected to the a and b wire of a telephone line are thus connected to ground by grounding bracket 1, with removed functional element 22.

While specific embodiments of the invention have been shown and described in detail to illustrate the application of the principles of the invention, it will be understood that the invention may be embodied otherwise without departing from such principles.

What is claimed is:

1. A grounding bracket arrangement for telecommunication and data transfer applications, comprising:

a hat-type rail provided as a carrier rail;

a connecting device for telecommunication and data applications; and a bracket including a bottom with a contact lug bent out from the bracket bottom, spring elements for resiliently latching in said hat-type rail and fastening elements for safe attachment at a bottom of said connecting device, wherein said spring elements are formed by two U-shaped configurations, and said contact lug is formed by cutting-free a portion from said bracket bottom.

2. A grounding bracket arrangement according to claim 1, wherein said spring elements are disposed tightly against interior sides of said hat-type rail, and said contact lug is disposed between the spring elements.

3. A grounding bracket arrangement according to claim 1, said bracket has a geometry adapted to a geometry of a bottom surface of said connecting device, and is latched thereinto.

4. A grounding bracket arrangement according to claim 1, wherein said contact lug includes a connection location for a grounding line.

5. A grounding bracket arrangement according to claim 1, wherein said contact lug is configured as a fork contact.

6. A grounding bracket arrangement according to claim 1, wherein cut-free portions are provided in said bracket bottom on either side of said contact lug.

7. A grounding bracket arrangement according to claim 1, wherein at longitudinal sides of said bracket latch lugs with openings are provided.

8. A grounding bracket arrangement according to claim 1, wherein an additional spring is mounted over said contact lug of said grounding bracket.

9. A grounding bracket arrangement according to claim 9, wherein said additional spring has spring arms electrically connecting contact rails provided in said connecting device.

10. A grounding bracket arrangement for telecommunication and data transfer applications, comprising:

a hat-type rail provided as a carrier rail;

a connecting device for telecommunication and data applications; and a bracket including a bottom with a contact lug bent out from the bracket bottom, spring elements for resiliently latching in said hat-type rail and fastening elements for safe attachment at a bottom of said connecting device, said spring elements being formed by two U-shaped configurations with curved bottoms and flat side walls for a stable connection with side walls of said carrier rail.

11. A grounding bracket arrangement according to claim 10, wherein said contact lug is formed by cutting-free a portion from said bracket bottom and said spring elements are disposed tightly against interior sides of said hat-type rail, and said contact lug is disposed between the spring elements and said bracket has a geometry adapted to a geometry of a bottom surface of said connecting device, and is latched thereinto.

12. A grounding bracket arrangement according to claim 10, wherein said contact lug includes a connection location for a grounding line.

13. A grounding bracket arrangement according to claim 10, wherein said contact lug is configured as a fork contact.

14. A grounding bracket arrangement according to claim 10, wherein cut-free portions are provided in said bracket bottom on either side of said contact lug.

15. A grounding bracket arrangement according to claim 10, wherein at longitudinal sides of said bracket latch lugs with openings are provided.

16. A grounding bracket arrangement according to claim 10, wherein an additional spring is mounted over said contact lug of said grounding bracket.

17. A grounding bracket arrangement according to claim 8, wherein said additional spring has spring arms electrically connecting contact rails provided in said connecting device.

18. A grounding bracket arrangement for telecommunication and data transfer applications, comprising:

a hat-type rail provided as a carrier rail including a base and legs disposed substantially at 90° with respect to said base;

a connecting device for telecommunication and data applications; and a bracket including a bottom with a contact lug bent out from the bracket bottom, spring elements for resiliently latching in said hat-type rail and fastening elements for safe attachment at a bottom of said connecting device, said spring elements being formed by two U-shaped configurations for a stable connection with side walls of said carrier rail.

19. A grounding bracket arrangement according to claim 18, wherein said contact lug is formed by cutting-free a portion from said bracket bottom and said contact lug is disposed between the two spring elements.

20. A grounding bracket arrangement according to claim 18, said bracket has a geometry adapted to a geometry of a bottom surface of said connecting device, and is latched thereinto.

* * * * *